Aug. 18, 1936.  L. F. CHANEY  2,051,540
THERMOMETER
Filed Sept. 26, 1935
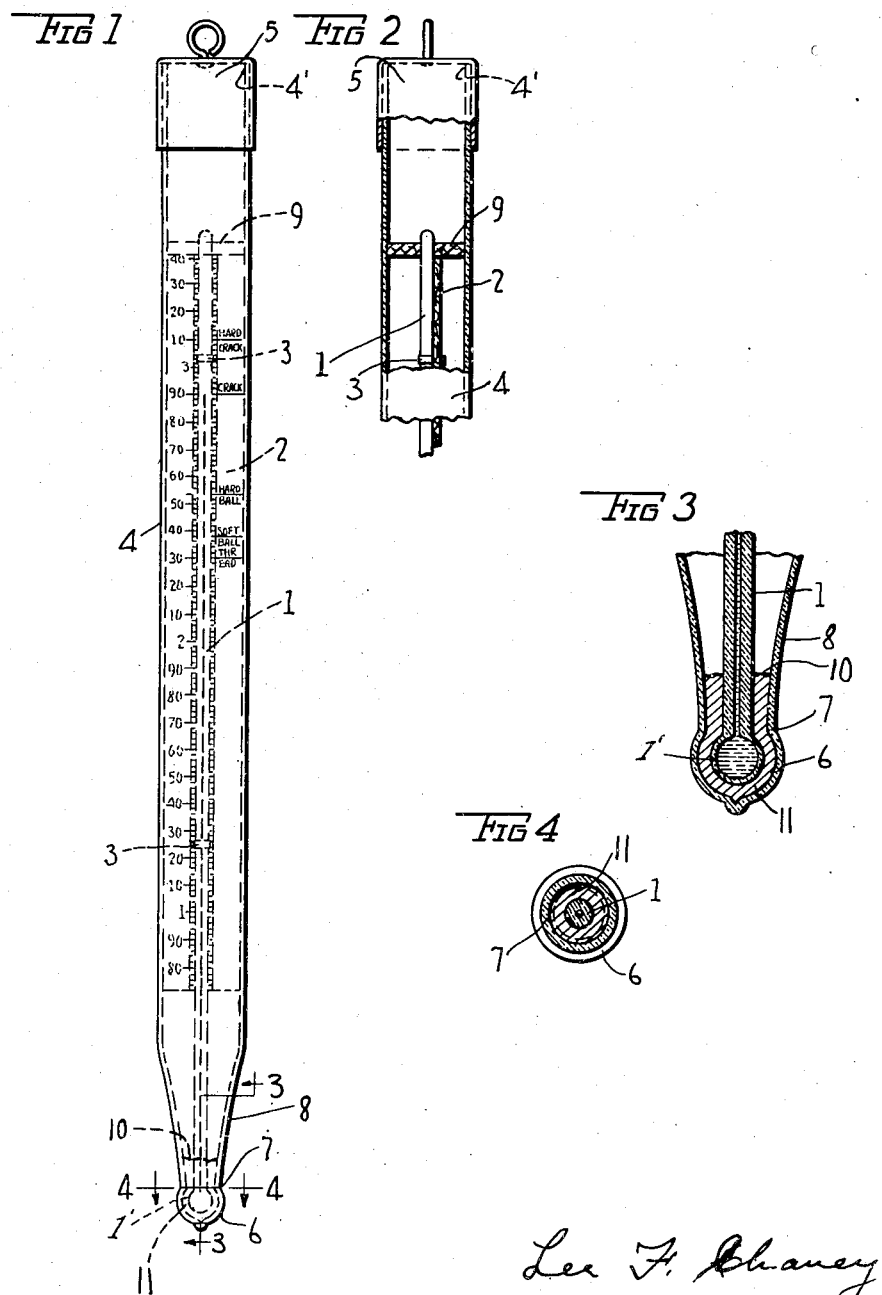

Patented Aug. 18, 1936

2,051,540

UNITED STATES PATENT OFFICE 2,051,540

THERMOMETER

Lee F. Chaney, Springfield, Ohio, assignor of one-half to John L. Chaney, Springfield, Ohio Application September 26, 1935, Serial No. 42,265

3 Claims. (Cl. 73—52)

This invention relates to improvements in thermometers of the type which are adapted to be inserted in the material whose temperature is to be ascertained; the thermometer in the present case being one especially adapted to ascertain the temperature of candy while it is being cooked.

The object of the invention is to prevent displacement of the thermometer tube or element with respect to the outer enclosing tube should the device be inverted. When an outer glass tube is employed to enclose the element, it is essential to provide a good thermal path for the heat of the material being tested to the thermally responsive fluid of the element. A sufficiently good thermal contact is not obtainable by the mere resting of the bulb of the element against the wall of the outer tube, and to provide a better path, filling materials of various nature such as sand, waxes, fine metallic shot, have been resorted to fill the void between the bulb and the inner surface of the enclosing tube. Of all filling materials formerly or now in use, I have found that a filling of a low melting point metallic alloy is most suitable. This filling is applied in either of three methods. By one method, a few pellets of the metal are dropped into the outer tube, the thermometer tube inserted, and the melting of the pellets brought about by inserting the outer tube in a hot bath of a suitable oil of a temperature sufficient to melt the metal after which the molten metal is allowed to cool. Another method is to apply a flame to the lower end of the outer tube after the metal pellets and the thermometer tube have been inserted and thereby reduce the pellets to a molten state, after which the mass of metal is allowed to cool. A third method is to pour a suitable quantity of an alloy in a molten state into the outer glass tube and then insert the lower end of the thermometer tube in the molten mass and then cooling the molten mass.

The single drawback of the use of alloys is that in an ordinarily formed or blown outer glass tube, the alloy, while it conforms substantially to the contours of both the inner portion of the outer tube and the element, has no adhesion and will not fit tightly because it contracts upon cooling, and if the device is inverted or accidentally jarred while inverted, the pellet is apt to become dislodged and it would be difficult, if not impossible, to again arrange the parts as they were originally.

This difficulty has been obviated in the present invention by the peculiar manner of forming the lower end of the outer enclosing tube as described and shown in the following specification and drawing.

In the accompanying drawing:

Fig. 1 is a front elevation of a thermometer embodying my invention.

Fig. 2 is a fragmentary view partly in side elevation and partly in longitudinal section of the same.

Fig. 3 is a fragmentary enlarged longitudinal section on the line 3—3 of Fig. 1.

Fig. 4 is an enlarged transverse section on the line 4—4 of Fig. 1.

Referring to the drawing, the thermometer element with its bulb 1' is indicated at 1, and 2 is the scale card which is clipped to the element 1 by the small clips 3 in the usual manner. The outer enclosing tube is represented at 4, and is open at its upper end 4' for the insertion of the element 1 and scale card 2 in assembly, and after the heating operation, to be described, the upper end 4' is closed by fusing that end of the tube by heat, and then securing in position thereover by cementing or otherwise a metallic cap 5.

The lower end of the outer enclosing tube is formed by blowing to provide the substantially spherical bulb 6. Directly above the major portion of the spherical bulb 6 the bulb is drawn into the constricted neck portion 7 which then flares upwardly and outwardly at 8 to meet the lower end of the cylindrical portion of the outer tube 4. The internal diameter of the neck 7 is slightly greater than the bulb 1' of the element to allow the bulb 1' to pass into the interior of the bulb 6.

In assembly after the scale card is clipped to the thermometer element 1, a disk 9 having a central opening is slipped on the upper end of the element, this disk acting as a centering member, its outer diameter being substantially equal to the internal diameter of the cylindrical portion of the outer enclosing glass tube 4.

Preferably the first or second mentioned method of melting the alloy is followed, and to this end, a few pellets or granules of a sufficient quantity of the alloy are dropped into the outer tube 4, these pellets falling into the spherical bulb 6 and the lower end of the flared portion 8 above the neck 7. The element 1 with its scale card 2 and disk 9 is then inserted into the outer tube 4, so far as it will go at this time, the bulb 1' of the element resting on the pellets of the alloy. When the heat of the hot oil bath or the flame is applied to the exterior of the outer bulb 6 and the alloy is melted the element 1 is pushed further into its proper place, where the bulb 1' of the element is substantially centrally located in the central portion of the outer bulb 6.

The proper quantity of metal is such that when the element is pushed into the molten metal, the displacement of metal by the bulb 1' of the element will cause the level of the molten metal to rise above the neck portion 7 of the outer tube 4 as indicated at 10, Fig. 3.

It will then be seen that after cooling, the element cannot drop out of the tube 4 when the same is inverted, since the metal 11 surrounding the bulb 1' of the element 1 is almost completely enclosed by the bulb 6 of the outer tube 4, and further, a good thermal path for the passage of heat to the element is formed. By the use of the centering washer or disk 9 at the upper end of the element 1, this end is protected from any lateral movement which might cause damage.

The melting point of the metal 11 is preferably about 100° above the temperature of the cooking candy or other material in which it is inserted.

Having thus described my invention, I claim:

1. In a thermometer, an outer enclosing tube closed at its lower end, the lower end of said tube having an enlargement, a unitary solid body of thermal conducting anchoring material filling said enlargement, and a thermometer tube within said enclosing tube and having its bulbous end imbedded in said anchoring material.

2. In a thermometer, an outer enclosing tube closed at its lower end, the lower end of said tube being reduced in diameter, the lower end of said reduced portion having an enlargement, a unitary solid body of thermal conducting anchoring material filling said enlargement, and a thermometer tube within said enclosing tube and having its bulbous end imbedded in said anchoring material.

3. In a thermometer, an outer enclosing tube closed at its lower end, the lower end of said tube being gradually reduced in diameter save for the extreme lower end which is formed with an enlargement of greater diameter than that portion of the tube immediately adjacent thereto, a unitary solid body of thermal conducting anchoring material filling said enlargement, and a thermometer tube within said enclosing tube and having its bulbous end imbedded in said anchoring material.

LEE F. CHANEY.